July 12, 1960  R. C. BAKER  2,944,796
ROTARY EXPANSIBLE DRILL BITS
Filed June 20, 1955  2 Sheets-Sheet 1
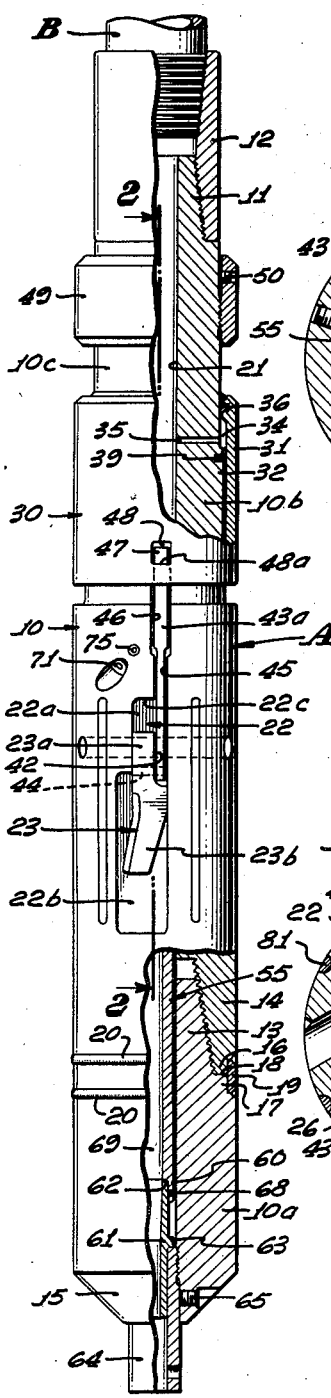
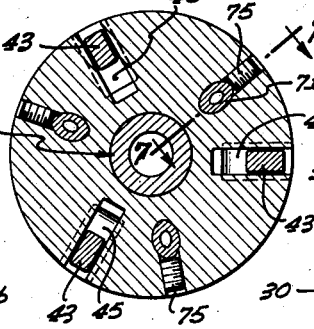
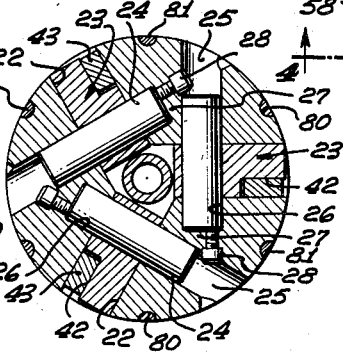
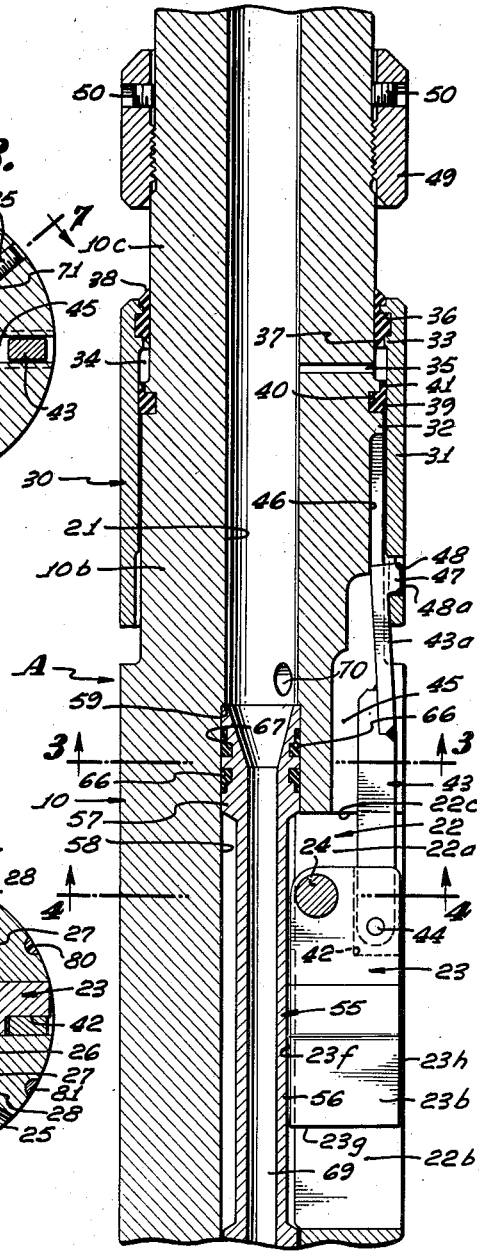
INVENTOR.
REUBEN C. BAKER
BY
Mellin and Hanscom
ATTORNEYS July 12, 1960 R. C. BAKER 2,944,796
ROTARY EXPANSIBLE DRILL BITS
Filed June 20, 1955 2 Sheets-Sheet 2

INVENTOR.
REUBEN C. BAKER
BY
Mellin and Hanscom
ATTORNEYS

United States Patent Office 2,944,796
Patented July 12, 1960

2,944,796
ROTARY EXPANSIBLE DRILL BITS

Reuben C. Baker, Coalinga, Calif., assignor to Baker Oil Tools Inc., Los Angeles, Calif., a corporation of California Filed June 20, 1955, Ser. No. 516,476

13 Claims. (Cl. 255—76)

The present invention relates to drill bits of the rotary type, and more particularly to rotary drill bits of the expansible type capable of drilling or enlarging a well bore below a string of well casing to a larger diameter than the inside diameter of the casing string itself.

An object of the present invention is to provide a rotary drill bit embodying cutters which are expanded outwardly hydraulically and in which a much greater hydraulic force, for the same unit pressure, is available to insure lateral outward movement of the cutters to the desired maximum extent.

Another object of the invention is to provide an expansible type of rotary drill bit, in which more than two expansible cutters are employed to insure stable operation of the bit and the drilling of a full gauge, circular hole, the cutters being of relatively large and sturdy size, and therefore possessing a long useful life.

A further object of the invention is to provide an expansible type of rotary drill bit having cutters expanded laterally outward by drilling fluid under hydraulic pressure, in which the cutters and a large part of the operating mechanism for expanding the cutters hydraulically are relieved of the hydraulic pressure after outward expansion of the cutters has occurred.

Yet another object of the invention is to provide an expansible type of rotary drill bit having cutters pivotally mounted on the main body of the bit, in which the pivot for each cutter is so located with respect to the cutter as to reduce the drilling load on the pivot during the drilling operation.

Still a further object of the invention is to provide an expansible rotary drill bit embodying cutter blades swingable outwardly to expanded position by a mechanism including linkage, in which the link connection to each blade is offset to the side of the blade, to facilitate blade manufacture at a reduced cost, while the blades still possess a large thickness and a large bearing surface against the main body of the bit when the blades have been expanded fully.

Yet a further object of the invention is to provide an expansible rotary drill bit in which circulation can be conveyed to the bottom of the bit, embodying an improved circulation device for such purpose.

Another object of the invention is to provide an expansible rotary drill bit embodying circulation nozzles that will maintain the drilling area clean of cuttings, thereby insuring maximum drilling effectiveness of the cutters on the formation.

Still another object of the invention is to provide an expansible rotary drill bit embodying more than two cutter blades mounted on the main body of the bit, in which the cutting edge of each blade lies on a radius from the body center line or axis when the cutter blade has been fully expanded, thereby insuring maximum cutting effectiveness of each cutter blade upon the formation.

A further object of the invention is to provide a cutter blade in an expansible rotary drill bit that is more resistant to bending under torque loads during the drilling operation.

Another object of the invention is to provide an expansible rotary drill bit having an improved manner of securing a pilot, or another bit, to the main body of the rotary drill bit, whereby a welded arrangement can be used in securing the pilot or other bit to the main body, the pilot or other bit being removed easily without the necessity for cutting into the pilot or other bit, or main body of the expansible bit.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a combined side elevational and longitudinal sectional view of a rotary expansible drill bit embodying the invention, with the cutter blades disclosed in retracted position;

Fig. 2 is an enlarged fragmentary longitudinal section taken along the line 2—2 on Fig. 1;

Fig. 3 is a cross section taken along the line 3—3 on Fig. 2;

Fig. 4 is a cross section taken along the line 4—4 on Fig. 2;

Figure 5:
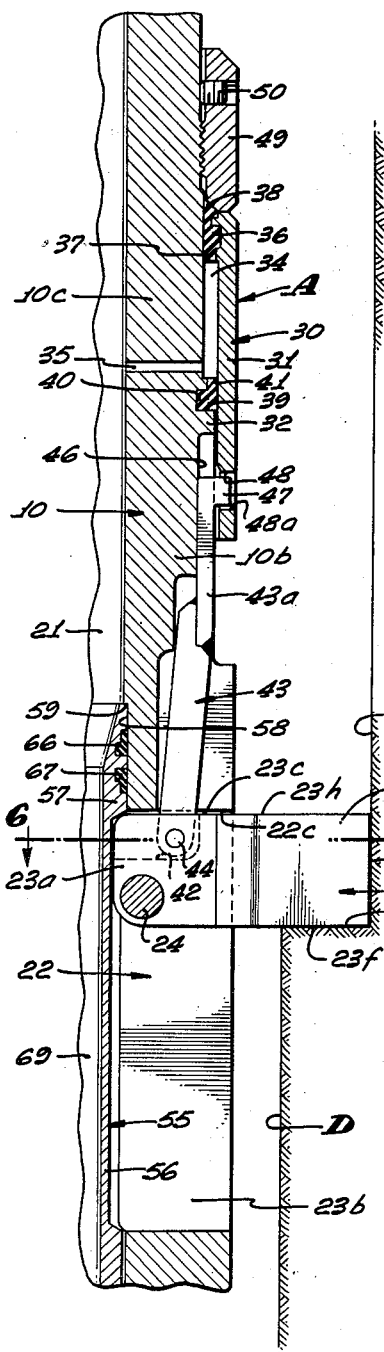
Fig. 5 is a view similar to Fig. 2, disclosing the parts of the bit in the position they occupy when the cutter blades have been expanded outwardly to the maximum extent.
Figure 6:
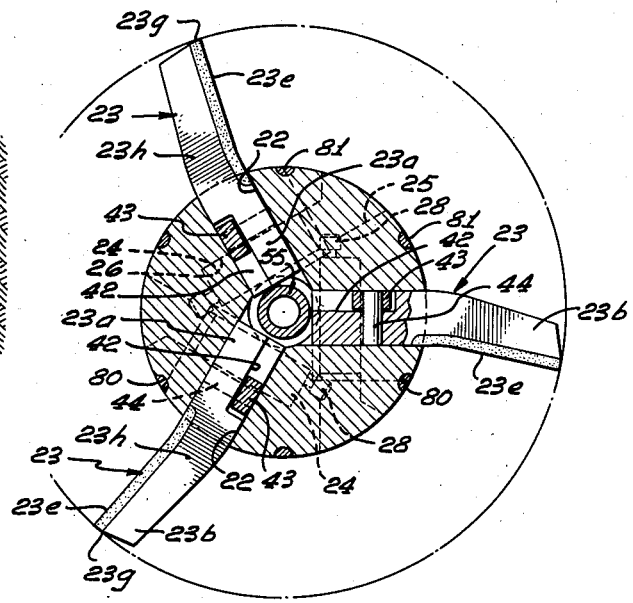
Fig. 6 is a full cross-section through the entire tool taken along the plane of the line 6—6 on Fig. 5.

The rotary drill bit A disclosed in the drawings is of the expansible type, being designed to be lowered through a string of well casing (not shown) with its cutter members in retracted position. Upon reaching a desired location in the well bore below the lower end of the casing, the cutters can be expanded outwardly by hydraulic pressure, for the purpose of drilling or enlarging the hole to a diameter that is substantially greater than the inside diameter of the casing through which the tool has been lowered.

As specifically disclosed, the expansible drill bit A includes an elongate tubular main body 10 having an upper threaded pin 11 threadedly secured to a sub or collar 12 forming the lower end of a string of drill pipe B extending to the top of the well bore, and by means of which the tool A is lowered in the well bore and is rotated while circulating fluid, such as drilling mud, is being pumped down through the drill pipe and through the tool itself. The lower end of the body 10 may be constituted as a pilot or guide 10a having an upper pin 13 threaded into a companion lower box 14 of the main body of the tool, the guide 10a preferably being provided with a downward and inwardly tapering end 15, to facilitate downward movement of the tool through the well casing and a previously drilled hole therebelow.

As disclosed, the threaded pin 13 of the pilot 10a is prevented from becoming inadvertently detached from the threaded box 14 by a welded construction. Thus, the lower portion 16 of the threaded box and that portion 17 of the main body of the pilot immediately below its shoulder 18, which abuts the lower end of the threaded box 14, are reduced in external diameter to jointly form a groove to receive a ring 19, preferably of substantially the same outside diameter as that of the pilot 10a and main body 10 of the expansible bit. The upper and lower ends of the ring 19 are secured to the main body 10 of the tool and to the pilot 10a by welding material 20 running completely around the ring. In this manner, the lower end of the main body 10 is firmly secured to the pilot 10a, preventing the latter from becoming inadvertently unscrewed from the main body. In the event it is desired to remove the pilot from the main body, all that need be done is to cut the ring 19 away, whereupon the pilot 10a can be unthreaded from the main body 10. Thereafter, the same or another pilot, or a lower bit, may be threaded to the main body 10, and firmly secured thereto by welding another ring 19 to the main body and to the body pilot or lower bit.

By virtue of the ring arrangement which has been just described, it is unnecessary to cut away any part of the main body or pilot itself in effecting a separation between them. All that need be destroyed is the ring 19.

The main body 10 of the bit has a central passage 21 extending completely therethrough, this passage also extending through the pilot 10a. A plurality of longitudinally extending slots 22 are formed through the wall of the main body, these slots extending from the passage 21 completely to the exterior of the body. As disclosed, the slots are three in number, being spaced substantially equiangularly from each other for the purpose of accommodating cutter blades 23 which are to enlarge the diameter of the well bore. A cutter blade 23 is pivotally mounted in each slot, being swingable upon a pivot or hinge pin 24 extending transversely across the slot. Each pin 24 may be inserted through a transverse bore 25 substantially at right angles to the slot 22, the pin sliding through this bore on one side of the slot and into an aligned bore 26 on the other side of the slot against the end wall 27 of which the end of the pin can shoulder. The pin 24 itself is prevented from being inadvertently removed from the aligned bores by a cap screw 28 threaded into the body, the head of which extends into the bore 25 adjacent the outer end of the pin.

When each blade 23 is in retracted position, it hangs or depends from its hinge pin 24 in the longitudinal slot 22. The upper portion 22a of this slot has a width substantially equal to the thickness of the upper or inner portion 23a of the cutter blade, so that the blade slides along the opposed walls of the upper slot portion. The hinge pin 24 extends across such upper slot portion 22a. The lower portion 22b of the slot is much wider than the upper portion 22a to accommodate the outer part 23b of the blade, which is disposed at an angle to the inner part 23a of the blade, for a purpose which will be described below.

When each blade 23 occupies its retracted position within the body 10, it hangs in the manner disclosed in Fig. 2. It is swingable upwardly and laterally outwardly to the expanded position disclosed in Fig. 5, and when occupying its fully expanded position the upper end 23c of the blade engages the upper end 22c of the slot. Accordingly, the drilling weight to be imposed on the blade 23 is transmitted from the upper end 22c of the slot directly onto the blade 22, and from the outer portion of the latter onto the formation shoulder C that the cutter blades produce in the well bore D.

The blades 23 are swingable from their downward retracted position to their upward outwardly expanded position hydraulically. To accomplish this action, a hydraulic cylinder and piston device is provided on the main body of the bit above the cutter blades. A cylinder 30 is slidable along a reduced diameter portion 10b of the body, the diameter being reduced in order that the outside diameter of the cylinder 30 is preferably no greater than the maximum outside diameter of the main body 10 of the tool. This cylinder includes a cylinder sleeve 31 slidable along the piston portion 32 of the body, the cylinder sleeve terminating in an upper, inwardly directed cylinder head 33 slidable along or with respect to a further reduced diameter portion 10c of the main body of the tool above the upper end of the body piston 32. Initially, and with the cutters 23 in their retracted position, the cylinder head 33 and the piston 32 are spaced from each other by a small amount to provide an annular cylinder space 34 into which fluid under pressure pumped down through the drill pipe B and into the central passage 21 of the body can pass, communication between the body passage and the cylinder space 34 being provided by one or more side ports 35 extending through the body wall.

To preclude leakage of fluid in an upward direction out of the cylinder space 34, the cylinder head 33 may have a packing or seal member 36 secured thereto slidable along the periphery of the body 10c above the side port or ports 35. As disclosed, this packing member has a downward lip seal 37 adapted to slidably seal against the periphery of the body and to be pressed thereagainst by the fluid pressure within the cylinder space 34. The upper portion of the packing is formed as an upwardly tapering lip 38 to slidably engage the periphery of the body and act as a wiper, to preclude foreign material from entering the cylinder space from externally of the apparatus. The piston 32 carries a similar type of seal 39, in the form of a rubber or rubber-like ring, mounted in a circumferential groove 40 and slidably and sealingly engaging the inner wall of the cylinder sleeve 31. This seal 39 has an upwardly facing lip 41 adapted to be pressed by the fluid pressure in the cylinder space against the inner wall of the cylinder sleeve 31.

When pressure is developed within the body passage 21, it is exerted on the fluid in the side ports 35 and in the cylinder space 34, acting in an upward direction on the cylinder head 33 and head packing 36 to urge the cylinder 30 upwardly. Such upward movement is transferred to the retracted blades 23 through a linkage system. As specifically disclosed, each cutter blade has a recess 42 in the trailing side of its inner portion 23a to receive the lower end of a link 43, the link being connected to the blade by a pin 44 extending through both of these members, this pin being prevented from disassembly by the opposed side walls of the upper slot portion 22a. The link 43 extends upwardly of the slot, passing into a longitudinal groove 45 in the main body of the tool, this groove being much narrower than the blade slot and merging into another groove 46 of a slightly greater width than the link groove just mentioned, to accommodate a wider portion 43a of the link. Actually, the link is made in two parts, the lower part 43 being welded to the upper part 43a, the lower part being narrower than the upper part, but much thicker in a generally radial direction. This provides the proper strength in the upper part, while allowing it to slide in a shallower longitudinal groove 46 during upward movement of the cylinder 30 along the body. The upper portion of the link terminates in a generally radial, outwardly directed head 47 that fits loosely within an opening 48 comprising a lost motion connection in the side wall of the lower portion of the cylinder sleeve 31.

It is apparent that fluid under pressure in the cylinder space 34 will elevate the cylinder 30, which will cause the lower side 48a of each cylinder opening 48 to engage the link heads 47 and pull each link 43, 43a upwardly. This upward movement will swing each blade 23 in an upward and outward direction, until the blade is disposed in substantially its full outwardly expanded position. The upward movement of the cylinder 30 is limited by engagement of its head 33 with a stop ring 49 threaded on the body and prevented from inadvertently unscrewing or shifting with respect thereto by one or more set screws 50 threadedly received in the ring and bearing against the exterior of the body 10. It is preferred that the cylinder 30 engage the stop ring 49 just prior to full outward expansion of the cutter blades. When the cutter blades 23 are in this position they will have produced a lateral annular shoulder C in the well bore, whereupon drilling weight can be imposed on the cutters 23, which will swing them a slight additional distance upwardly, to bring the upper sides 23c of the blades against stop means comprising the upper ends 22c of the slot 22. When this additional upward movement occurs, the links 43, 43a are shifted upwardly within the lateral openings 48 in the cylinder sleeve 30, these openings having a greater vertical height than the height of the heads 47, so that, in effect, the heads no longer engage the lower 48a, or the upper, end of the lateral openings. Accordingly, any fluid pressure within the cylinder space 34 will act on the cylinder 30, holding it against the stop ring 49. Such fluid pressure will not be transmitted through the links 43, 43a to the cutter blades 23, since there is no longer any effective connection between the cylinder 30 and the links. For that reason the fluid pressure is only imposed upon the links 43, 43a and the cutter blades 23 during the outward expansion of the latter, and not during the drilling of the enlarged well bore.

For the purpose of supplying fluid pressure within the body passage 21, side ports 35 and cylinder space 34, to secure the hydraulic expansion of the cutter blades 23 to their outward position, a back pressure is caused to be built up within the passage 21. Such back pressure is created by throttling or restricting the flow of fluid through the passage 21 below the side ports 35 by a circulation device, which also serves the purpose of carrying circulating fluid to the bottom of the apparatus. Moreover, the circulation device closes the inner portions of the slots 22, so that there is no communication through the slots between the interior of the body and its exterior.

As specifically disclosed, the circulation device includes an elongate spacer tube 55 extending from a position substantially above the upper ends of the body slots 22 to a location within the pilot 10a. The spacer tube portion 56 opposite the body slots is preferably reduced in diameter to permit the use of wider blades 23, which can still be fully retracted within the confines of the body 10, the upper end or head 57 of the spacer tube engaging within an enlarged portion 58 of the body passage and abutting a transverse shoulder 59 provided in the body around its passage. The lower end 60 of the spacer tube fits over the upper portion of a circulation nozzle 61, the upper end of which engages a downwardly facing shoulder 62 on the tube. This circulation nozzle 61 has an intermediate outwardly directed flange 63 engaging the upper end of a clamp nut 64 threaded into the pilot passage and depending therefrom. By threading the clamp nut 64 upwardly into the body 10a, it is caused to bear against the circulation nozzle flange 63, forcing the latter against the lower spacer tube shoulder 62 and causing the upper end of the latter to be clamped against the body shoulder 59. In this manner, the circulation tube 55, circulation nozzle 61 and tubular clamp nut 64 are firmly secured to one another against longitudinal movement, as well as to the main body 10 of the tool and the body pilot 10a. Inadvertent unscrewing of the clamp nut 64 from the body may be prevented by a set screw 65 threaded transversely through the pilot 10a and bearing against the clamp nut.

Leakage of fluid around the exterior of the spacer tube 55 in upward and downward directions is prevented by opposed side seal rings 66, which may be made of rubber or rubber-like material, located in grooves 67 in the head 57, these seals engaging the inner wall of the enlarged passage 58 of the body. Leakage between the circulation nozzle 61 and spacer tube 55 may also be prevented by a side seal ring 68 in the spacer tube and engaging the periphery of the circulation nozzle.

The diameter of the passage 69 through the spacer tube 55 is substantially less than the diameter of the passage 21 through the body thereabove. This restricted diameter, in itself, is sufficient to cause fluid pumped down through the apparatus to build up a back pressure in the passage 21, for the purpose of elevating the cylinder 30 along the body 10 and expanding the blades 23 outwardly. However, if desired, the circulation nozzle 61 may have a minimum passage diameter that is still less than the diameter of the passage 69 through the spacer tube 55, to insure the building up of still a greater back pressure in the passage 21 above the spacer tube 55, in the side ports 35 and in the cylinder space 34. The fluid pumped down through the passage 21 will pass through the spacer tube 55, circulation tube 61 and clamp nut 64, being discharged into the well bore and thence flowing upwardly along the outside of the tool A to carry the cuttings upwardly to the top of the hole. By directing circuation to the bottom of the tool, assurance is had that the cuttings will not drop off the annular shoulder C and be disposed in the bottom of the well bore D.

As described above, the outer portion 23b of each blade 23, when the blades are in fully expanded position, is bent or disposed in a forward direction, being disposed at an angle to the inner portion 23a of each blade. Such bending is provided primarily to cause the forward cutter surface 23e of each blade to lie in a radial plane extending from the central axis or center line of the main body 10 of the bit. With this arrangement of parts, the most effective action occurs, inasmuch as the cutting edge of the blade has neither a positive nor a negative rake. The cutting forces are transmitted from each blade to the formation in a tangential direction, which insures a smoothly operating tool. The disposition of the outer portion 23b of the cutters at such an angle to the inner portion also increases the strength of each cutter blade, inasmuch as it is more resistant to the bending forces that the drilling torque imposes upon it. The leading face 23e of each blade, as well as its lower surface 23f, are provided with suitable hardfacing material to enhance its useful life. The outer portions 23g and also the top portions 23h of the blades are also provided with hardfacing material.

It is to be noted that each hinge pin 24 is located closely adjacent the bottom 23f of the blade when the latter is in its outer expanded position. The hinge pin 24 has heretofore been located midway along the vertical dimension of the blade when in an expanded position, or even closer to the upper portion 23c of the blade. By placing the hinge pin 24 at the lower edge of the blade, the drilling weight imposed upon the hinge pin is decreased, making the hinge pin capable of withstanding greater drilling weights for the same diameter. This is due to the fact that the drilling weight imposed by the formation upon the cutter urges the latter upwardly against the upper side 22c of the body slot 22, tending to tilt the blade about the outer edge of this slot and exerting a downward force upon the hinge pin 24. By placing the hinge pin adjacent the lower edge of the blade, the lever arm from the outer edge of the slot 22 to the hinge pin 24 is increased, which has the effect of decreasing the force of the formation on the blade transmitted to the hinge pin, resulting in a better design and stronger hinge pin and blade combination.

In the use of the apparatus, its parts are disposed with the blades in the vertical retracted position disclosed in Figs. 1 and 2, and with the cylinder 30 in its downward position along the body 10. The tool is run down through the casing until the location is reached below the casing shoe (not shown) at which the drilling action is to occur. When such location is reached, the drill pipe B and the expansible rotary drill bit A are rotated at the proper rate, and drilling fluid is pumped down the drill pipe, through the body passage 21, and the tubular circulation device 55, 61, 64 incorporated therein. The back pressure built up in the passage 21 will be imparted to the fluid in the side ports 35 and in the cylinder space 34, and will act on the cylinder head 33, shifting the cylinder 30 upwardly, which motion will be transmitted through the links 43, 43a to the blades 23, the latter being pivoted about their hinge or pivot pins 24 to cause the outer edges of the blades to engage the wall of the formation.

As rotation continues, the blades 23 will dig into the side wall of the well bore D, the cylinder 30 progressively pulling the blades 23 in an upward and outward direction as the cylinder is able to move upwardly along the body 10 of the tool. Such upward motion of the cylinder and outward expansion of the blades will continue until the upper end of the cylinder engages the stop ring 49, at which time the blades 23 have been expanded almost to their maximum extent. The blades will have produced a lateral annular shoulder C in the wall of the well bore D, which will then allow downweight or drilling weight to be imposed on the blades through the drill pipe B and the body 10 of the tool. Such downweight will shift the blades upwardly to a slight extent into engagement with the upper ends 22c of the slots 22, which will elevate the heads 47 of the links slightly above the lower ends of the cylinder openings 48, relieving the links and the blades of hydraulic pressure being imparted on the cylinder.

The tool may now be rotated at the proper speed and the proper drilling weight imposed thereon, to cause the blades 23 to operate upon the formation and to progressively enlarge the hole in a downward direction. As pointed out above, the outer leading face 23e of each blade is disposed in a radial plane extending from the central axis of the bit body 10, to insure proper and most effective operation of the blades upon the shoulder C as well as against the side wall E of the enlarged well bore. The fluid being pumped down through the body passage 21, spacer tube 55, circulation nozzle 61 and clamp nut 64 will flow upwardly around the body 10 to carry the cuttings upwardly to the top of the hole.

When it is desired to retrieve the tool from the hole, it is only necessary to stop the pumps at the top of the well and elevate the drill pipe B. When the cutters 23 reach a restricted hole diameter in the well bore or the casing shoe, they will engage such restricted bore diameter or casing shoe and be forced thereby inwardly to their retracted position. The inward and downward swinging of the blades will act through the links 43, 43a to pull the cylinder 30 back to its lower position. Following such retraction of the blades 23, the tool can be elevated through the casing and removed to the top of the hole.

Figure 7:
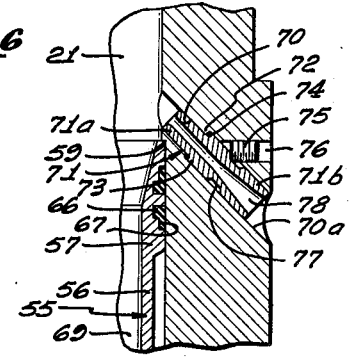
Fig. 7 is a partial longitudinal section taken along the line 7—7 on Fig. 3.

In order to enhance the drilling effectiveness of the cutters against the formation shoulder C, circulating fluid is also caused to impinge directly upon the shoulder immediately in advance of the blades 23, so that the blades are not required to operate upon a mass of loose cuttings, which will absorb some of the drilling weight imposed on the cutters and limit their penetration into virgin formation. To produce this result, the main body of the tool above and forward of each cutter is provided with a lateral bore 70 that inclines in a downward and outward direction (Fig. 7). As specifically disclosed in the drawings, the inner end of the bore opens into the body passage 21 above the spacer tube 55 and the outer end of the bore opens through the periphery of the body, to allow fluid to be discharged therefrom. The axis of the bore 70 is such that fluid discharged therefrom will strike against the formation shoulder C immediately in advance of the blade 23, to clean the formation shoulder of cuttings and cause them to be flushed to the top of the hole.

To secure the proper jetting action of the fluid against the formation shoulder C, a replaceable nozzle 71 is mounted in each bore 70. Thus, the outer portion 70a of each inclined bore is counterbored, to provide an inner shoulder 72. A nozzle 71 is slipped from the outside of the body inwardly into the bore 70, the inner end 71a of the nozzle being of a diameter to conform to the diameter of the inner portion of the bore 70, whereas the outer nozzle part 71b has a diameter to conform to the diameter of the outer portion 70a of the bore. The nozzle has a shoulder 73 opposite the body shoulder 72, between which a gasket 74, such as a rubber or rubber-like O ring, is placed. The nozzle 71 need merely be slipped into the passage 70, being held in proper position therewithin, with the gasket 74 appropriately effecting a seal between the nozzle and the body of the tool, by a set screw 75 threaded within a lateral bore 76 in the body and engaging the end of a peripheral groove 77 formed in the nozzle. The nozzle and set screw arrangement permits of easy assembly and replacement of nozzles 71 in the body as they become worn. It is only necessary to unscrew the set screw 75 from the body and slide the nozzle outwardly, a new nozzle being inserted in place and the set screw 75 rethreaded into the bore to engage against the end of the peripheral nozzle groove 77 and force its shoulder 73 against the gasket 74, to urge the latter against the body shoulder 72. The nozzle passage 78 is such as to direct a high velocity jet of drilling mud, or other fluid, against the formation shoulder C immediately in advance of the forward surface 23e of the blade 23, insuring that the formation shoulder will be maintained free of cuttings, the turbulence created by the nozzle in the well fluid also maintaining the blades themselves in a clean condition.

During the drilling of the enlarged hole E, the body 10 is cut by the drilling mud and cuttings moving upwardly past it. Such cutting or eroding action occurs along the length of the body in advance of and behind each blade slot 22. Accordingly, to minimize such cutting action, longitudinal grooves 80 are provided in the body immediately in advance of and immediately to the rear of each longitudinal slot, these grooves being filled in with hardfacing material 81, such as tungsten carbide, applied by a welding operation. It has been found that the life of the main body of the tool is considerably enhanced through the provision of the hardfacing material 81 at the places indicated.

It is, accordingly, apparent that a rotary expansible drill bit A has been provided in which the blades 23 can be expanded outwardly hydraulically through the use of a lesser unit hydraulic pressure than was heretofore necessary. This is due to the relatively large area that can be secured by providing the hydraulic mechanism, such as the hydraulic cylinder 30 on the periphery of the body, as compared with the prior placement of the hydraulic mechanism in the central passage 21 of the body. Despite the placing of the hydraulic mechanism on the periphery of the body, its over-all diameter is not increased. The hydraulic mechanism can effectively expand the blades 23 substantially to their fully open position, whereupon the full expansion occurs as a result of the downweight imparted on the apparatus, which prevents the hydraulic force from being imposed on the blades during the drilling operation itself. The connection between the links 43, 43a and the blades 23 is made to one side of the blade, which effects substantial economies in the production of the blades, while still providing a proper blade thickness and bearing between the blades and the sides and upper portion of the blade slots 22. The location of the hinge pins 24 at the bottom portion of each blade 23, when it is in expanded position, results in the reduction of the drilling weight transmitted to each pin. The angling of the outer portion 23b of each blade with respect to its inner portion 23a enables the forward cutting surface of these blades to be placed on a radial plane emanating from the body axis, which relationship is most effective in drilling upon the formation, and it also results in a blade that is more resistant to bending under the action of the drilling torque. The circulation is directed to the bottom of the hole by an arrangement that permits the body slots 22 to extend completely through the body wall, thereby allowing wider blades to be used. This circulation arrangement insures that all the cuttings are removed to the top of the hole. The formation being engaged by the cutter blades themselves is maintained free of cuttings by the action of the jet nozzles 71, which are readily insertable and replaceable with respect to the body of the tool and the central passage. The pilot 10a is easily removable from the body 10, and can be replaced by another pilot, or by a drill bit itself, without the necessity for performing any cutting operation on the body parts themselves. This occurs despite the use of a welded arrangement, insuring against inadvertent unthreading between the pilot and the main body of the tool.

The inventor claims:

1. In a rotary expansible drill bit for well bores: a main body having means thereon for connecting said body to a drill string and having a fluid passage communicable with the drill string; cutter means mounted on said body for lateral expansion outwardly of said body; said body having a portion engageable with said cutter means through which drilling torque from the drill string is transmitted to said cutter means; a cylinder on the exterior of said body portion movable longitudinally therealong; means operatively connecting said cylinder to said cutter means in order that longitudinal movement of said cylinder along said body portion shifts said cutter means laterally of said body; and means for feeding fluid under pressure from said passage into said cylinder to shift said cylinder longitudinally of said body portion to expand said cutter means laterally outward of said body.

2. In a rotary expansible drill bit for well bores: a main body having means thereon for connecting said body to a drill string and having a fluid passage communicable with the drill string; cutter means pivotally mounted on said body for lateral expansion outwardly of said body; said body having a portion engageable with said cutter means through which drilling torque from the drill string is transmitted to said cutter means; a cylinder on the exterior of said body portion movable longitudinally therealong; linkage means operatively connecting said cylinder to said cutter means in order that longitudinal movement of said cylinder along said body portion pivots said cutter means on said body laterally of said body; and means for feeding fluid under pressure from said passage into said cylinder to shift said cylinder longitudinally of said body portion to expand said cutter means laterally outward of said body.

3. In a rotary expansible drill bit for well bores: a main body having means thereon for connecting said body to a drill string and having a fluid passage communicable with the drill string; cutter means pivotally mounted on said body for lateral expansion outwardly of said body; said body having a portion engageable with said cutter means through which drilling torque from the drill string is transmitted to said cutter means; a cylinder surrounding said body portion above said cutter means and movable longitudinally of said body portion; linkage means operatively connecting said cylinder to said cutter means in order that longitudinal movement of said cylinder along said body portion pivots said cutter means on said body laterally of said body; and means for feeding fluid under pressure from said passage into said cylinder to elevate said cylinder along said body portion and expand said cutter means laterally outward of said body.

4. In a rotary expansible drill bit for well bores: a main body connectible to a drill string and having a fluid passage communicable with the drill string; cutter means pivotally mounted on said body for lateral expansion outwardly of said body; a cylinder on the exterior of said body movable longitudinally therealong; linkage means operatively connecting said cylinder to said cutter means in order that longitudinal movement of said cylinder along said body pivots said cutter means on said body laterally of said body; means for feeding fluid under pressure from said passage into said cylinder to shift said cylinder longitudinally of said body to expand said cutter means laterally outward of said body; first stop means on said body engaged by said cylinder to limit longitudinal movement of said cylinder along said body when moving in a cutter means expanding direction; and second stop means on said body operative to limit outward expansion of said cutter means after engagement of said first stop means by said cylinder; said linkage means including a lost motion connection permitting outward expansion of said cutter means after engagement of said first stop means by said cylinder.

5. In a rotary expansible drill bit for well bores: a main body connectible to a drill string and having a fluid passage communicable with the drill string; cutter means pivotally mounted on said body for lateral expansion outwardly of said body; a cylinder on the exterior of said body movable longitudinally therealong; interconnecting means operatively connecting said cylinder to said cutter means in order that longitudinal movement of said cylinder along said body pivots said cutter means on said body laterally of said body; means for feeding fluid under pressure from said passage into said cylinder to shift said cylinder longitudinally of said body to expand said cutter means laterally outward of said body; first stop means on said body engaged by said cylinder to limit longitudinal movement of said cylinder along said body when moving in a cutter means expanding direction; and second stop means on said body operative to limit outward expansion of said cutter means after engagement of said first stop means by said cylinder; said interconnecting means including a lost motion connection permitting outward expansion of said cutter means after engagement of said first stop means by said cylinder.

6. In a rotary expansible drill bit for well bores: a main body connectible to a drill string and having a fluid passage communicable with the drill string; cutter means pivotally mounted on said body for lateral expansion outwardly of said body; a cylinder on the exterior of said body movable longitudinally therealong; a link pin-connected to said cutter means and having a head extending into an opening in said cylinder to connect said link to said cylinder; and means for feeding fluid under pressure from said passage into said cylinder to shift said cylinder longitudinally of said body to expand said cutter means laterally outward of said body.

7. In a rotary expansible drill bit for well bores: a main body connectible to a drill string and having a fluid passage communicable with the drill string; cutter means pivotally mounted on said body for lateral expansion outwardly of said body; a cylinder surrounding said body above said cutter means and movable longitudinally of said body; a link pin-connected to said cutter means and having a head extending into an opening in said cylinder to connect said link to said cylinder; and means for feeding fluid under pressure from said passage into said cylinder to elevate said cylinder along said body and expand said cutter means laterally outward of said body.

8. In a rotary expansible drill bit for well bores: a main body connectible to a drill string and having a fluid passage communicable with the drill string; cutter means pivotally mounted on said body for lateral expansion outwardly of said body; a cylinder surrounding said body above said cutter means and movable longitudinally of said body; a link pin-connected to said cutter means and having a head extending into an opening in said cylinder to connect said link to said cylinder; means for feeding fluid under pressure from said passage into said cylinder to elevate said cylinder along said body and expand said cutter means laterally outward of said body; first stop means on said body engaged by said cylinder to limit upward movement of said cylinder along said body when moving in a cutter means expanding direction; and second stop means on said body operative to limit outward expansion of said cutter means after engagement of said first stop means by said cylinder; said head having a loose fit in said cylinder opening to provide a lost motion connection permitting outward expansion of said cutter means after engagement of said first stop means by said cylinder.

9. In a rotary expansible drill bit for well bores: a main body connectible to a drill string and having a fluid passage communicable with the drill string, said main body having a slot therein opening outwardly of said body; cutter means pivotally mounted in said body within said slot for lateral expansion outwardly of said body; a cylinder surrounding said body above said cutter means and movable longitudinally of said body; a link pin-connected to said cutter means and having a head extending into an opening in said cylinder to connect said link to said cylinder; means for feeding fluid under pressure from said passage into said cylinder to elevate said cylinder along said body and expand said cutter means laterally outward of said body; stop means on said body engaged by said cylinder to limit upward movement of said cylinder along said body when moving in a cutter means expanding direction; the upper end of said body slot engaging said cutter means after engagement of said stop means by said cylinder to limit outward expansion of said cutter means; said head fitting loosely in said cylinder opening to provide a lost motion connection permitting outward expansion of said cutter means after engagement of said stop means by said cylinder.

10. In a rotary expansible drill bit for well bores: a main body connectible to a drill string and having a fluid passage communicable with the drill string; cutter means pivotally mounted on said body for lateral expansion outwardly of said body; a cylinder on the exterior of said body movable longitudinally therealong; linkage means operatively connecting said cylinder to said cutter means in order that longitudinal movement of said cylinder along said body pivots said cutter means on said body laterally of said body; and means for feeding fluid under pressure from said passage into said cylinder to shift said cylinder longitudinally of said body to expand said cutter means laterally outward of said body; said cutter means having a recess in one of its side walls; said linkage means including a link disposed in said recess and pin-connected to said cutter means in said recess.

11. In a rotary expansible drill bit for well bores: a main body connectible to a drill string and having a fluid passage communicable with the drill string, said body having a slot opening outwardly thereof; a cutter blade disposed in said slot pivotally mounted on said body for lateral expansion outwardly of said body; a cylinder surrounding said body above said cutter blade and movable longitudinally of said blade body; linkage means operatively connecting said cylinder to said cutter blade in order that longitudinal movement of said cylinder along said body pivots said cutter blade on said body laterally of said body; means for feeding fluid under pressure from said passage into said cylinder to elevate said cylinder along said body to expand said cutter blade laterally outward of said body; said cutter blade having a recess in one of its side walls; said linkage means including a link disposed in said recess and pin-connected to said cutter blade in said recess, said link being slidable along said blade and an adjoining side wall of said body slot during longitudinal movement of said cylinder along said body.

12. In a rotary expansible drill bit for well bores: a main body connectible to a drill string and having a fluid passage communicable with the drill string; said body having a plurality of circumferentially spaced slots therein opening into said passage and to the exterior of said body; cutter means in said slots pivotally mounted on said body for lateral movement outwardly of said body slots; a cylinder surrounding said body above said cutter means and movable longitudinally of said body; linkage means operatively connecting said cylinder to said cutter means in order that longitudinal movement of said cylinder along said body pivots said cutter means on said body laterally of said body; means for feeding fluid under pressure from said passage into said cylinder to elevate said cylinder along said body and expand said cutter means laterally outward of said body; and tubular conducting means in said passage having leakproof engagement with said body on opposite sides of said slots and below said fluid feeding means to conduct fluid in said passage to a location below said slots.

13. In a rotary expansible drill bit for well bores: a main body having a longitudinally extending slot therein; a cutter blade in said slot pivotally mounted on said body and adapted to occupy a downward retracted position within said slot and to swing in a lateral and upward direction outwardly of said body to a predetermined extent; means for elevating said blade to swing said blade laterally outward of said body from its downward retracted position; said cutter blade having an inner portion and an outer portion at an angle to and forwardly of said inner portion; the leading cutter edge of said outer portion being disposed radial of the central longitudinal axis of said body when said cutter blade has been elevated and expanded to said predetermined extent; the upper portion of said slot being of substantially the same width as the thickness of the inner portion of said blade and receiving said inner portion of said blade, the lower portion of said slot being substantially wider than said upper slot portion to accommodate the outer portion of said blade when said blade is in its downward retracted position.

References Cited in the file of this patent

UNITED STATES PATENTS

| | | |
|---|---|---|
| 1,857,616 | Baker | May 10, 1932 |
| 1,933,749 | Murray | Nov. 7, 1933 |
| 1,995,389 | Howard et al. | Mar. 26, 1935 |
| 2,031,353 | Woodruff | Feb. 18, 1936 |
| 2,034,074 | Wright | Mar. 17, 1936 |
| 2,141,111 | Mitchell | Dec. 20, 1938 |
| 2,203,998 | O'Grady | June 11, 1940 |
| 2,457,628 | Baker | Mar. 28, 1948 |
| 2,644,673 | Baker | July 7, 1953 |
| 2,719,700 | Kammerer | Oct. 4, 1955 |
| 2,755,070 | Kammerer | July 17, 1956 |
| 2,822,149 | Kammerer | Feb. 4, 1958 |